May 16, 1967 J. MARCONI 3,319,339
MULTI-HEIGHT COMPARATOR AND GAUGE
Filed April 5, 1965 2 Sheets-Sheet 1
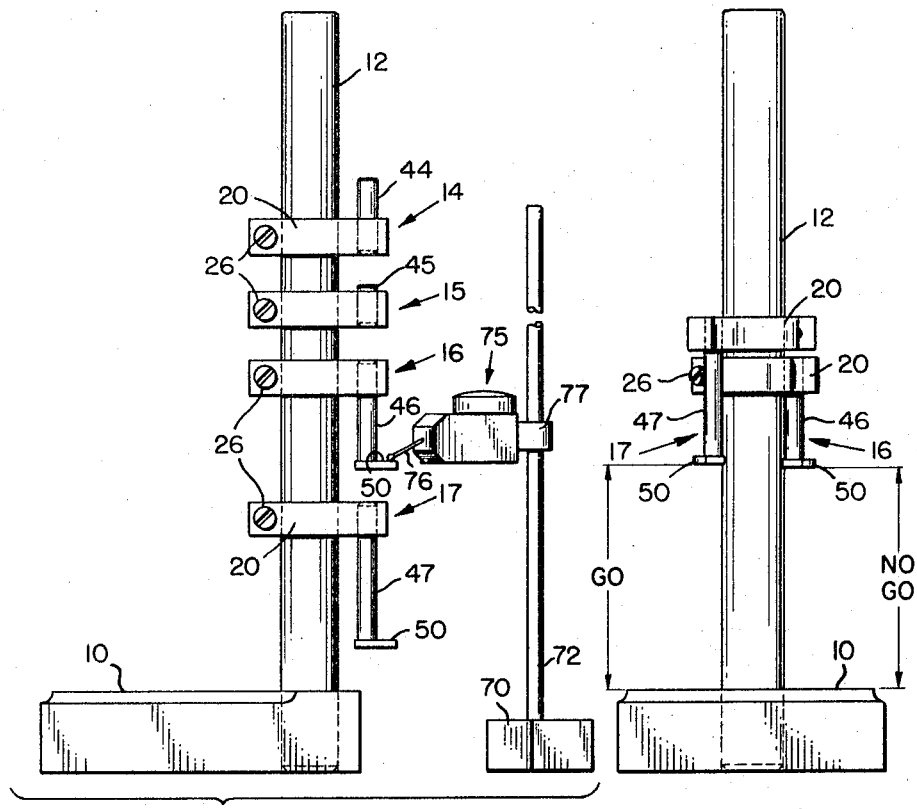
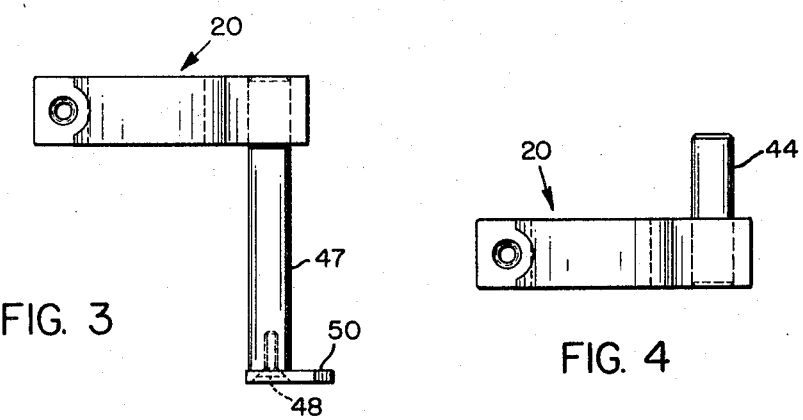
INVENTOR.
JOSEPH MARCONI
BY
ATTORNEY May 16, 1967  J. MARCONI  3,319,339

MULTI-HEIGHT COMPARATOR AND GAUGE

Filed April 5, 1965  2 Sheets-Sheet 2

INVENTOR.
JOSEPH MARCONI

BY

ATTORNEY

United States Patent Office 3,319,339
Patented May 16, 1967

3,319,339
MULTI-HEIGHT COMPARATOR AND GAUGE
Joseph Marconi, Endicott, N.Y., assignor to Endicott Machine and Tool Company, Inc., Endicott, N.Y., a corporation of New York
Filed Apr. 5, 1965, Ser. No. 445,522
4 Claims. (Cl. 33—169)

ABSTRACT OF THE DISCLOSURE

A multi-height gauge has a cylindrical post supported on a base, a plurality of reference gauge members mounted by split clamps on the post for vertical adjustment thereon, a screw for locking each clamp on the post, and a resilient member between each screw and clamp for frictionally holding the clamp in any adjusted position before tightening its screw. Each reference gauge member is adjusted precisely to the desired height of a surface to be measured. To measure the height of a surface, a micro gauge is engaged with a gauge member and set, and is then swung to engage the surface, whose height is to be measured, to compare the height of that surface with the height of the gauge member.

---

The present invention relates to gauges, and more particularly to height gauges and to "go" and "no go" gauges for gauging stamped or milled metal parts.

The conventional height gauge is an expensive tool, and is cumbersome to set up and operate. It may be a micrometer type gauge or it may involve a graduated dial gauge whose operating plunger is actuated through a lever mechanism that engages the part whose height is to be gauged. If the part being gauged has several different surfaces at different heights, respectively, from its base, or has several different holes in it, for instance, whose height has to be measured, or whose distance from one another has to be gauged, several different set-ups of the height gauge are required, and the measurement and computation become time-consuming. Heights may also be gauged with precision measuring blocks, or with such blocks used in conjunction with a surface gauge. None of these methods lends itself particularly well to production work.

One object of the present invention is to provide a gauge or comparator that may be used for setting conventional dial gauges quickly and easily to gauge the heights of parts that are manufactured in production quantities.

Another object of the invention is to provide a comparator for use in accurately and quickly setting gauges to measure the heights of a plurality of parts which are, respectively, at different heights.

Another object of the invention is to provide a comparator of the type described which itself requires no checking or calibration, but which can readily be pre-set accurately with Johansson blocks, or similar precision measuring means, so as to be usable quickly and precisely for setting a conventional gauge to gauge the heights of various parts.

Another object of the invention is to provide a comparator of the type described which can be used for repetitive checking of the gauges used in gauging the heights of a plurality of different surfaces that are, respectively, at different heights.

Another object of the invention is to improve quality control at the stamping or milling machine by providing a relatively inexpensive comparator for use as a height reference gauge enabling the machine operator to check his work on the job.

Another object of the invention is to provide a comparator of the type described which will increase machine production by enabling operators to check their work for height faster as well as better.

Another object of the invention is to provide a comparator of the character described which also can be used as a "go" and "no go" gauge.

A still further object of the invention is to provide a comparator which is sturdy, and simple to set.

Other objects of the invention will be apparent hereinafter from the specification and from the recital of the appended claims, particularly when read in conjunction with the accompanying drawings.

In the drawings:

FIG. 1 is a side elevation of a comparator made according to one embodiment of the present invention and illustrating how it may be used for setting and checking the position of a standard dial gauge so that gauge may be used in gauging height;

FIG. 2 is a front view showing how this comparator may be set up for use as a "go" and "no go" gauge;

FIG. 3 is a detail view showing in side elevation one of the gauging members of the comparator;

FIG. 4 is a detail view showing in side elevation another of these gauging members;

Figure 5:
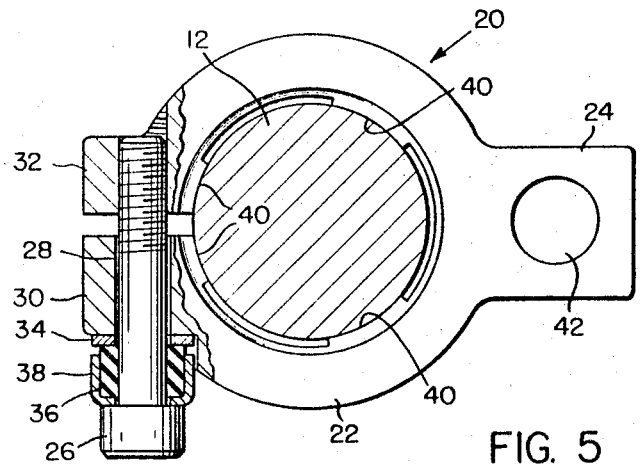
FIG. 5 is a detail showing in plan view, but partly broken away, the structure of the clamp for securing the different gauging members on the post which supports the same.

Referring now to the drawings by numerals of reference, 10 denotes the base of the comparator. Mounted with a pressed fit in a hole at one side of the base is a post or spindle 12.

The post, which may be of any suitable height, may carry a plurality of indicating or positioning members. In the embodiment of the invention shown in FIG. 1, there are four indicating members slidably and removably mounted upon the post or spindle. These are denoted at 14, 15, 16, and 17, respectively. The indicating members 14 and 15 are similar to one another in construction; and the indicating members 16 and 17 differ somewhat from the indicating members 14 and 15, but are similar to one another in construction.

Each of the indicating members comprises a clamping and supporting member 20, which has a split clamping portion 22 (FIG. 5), and a laterally protruding rod supporting portion or boss 24. The split clamping portion 22 is adapted to be secured tightly on the post 12 by a screw 26 which slides through an opening 28 in a lug 30 formed integral with one end of the split clamp and threads into the confronting lug 32 which is formed integral with the other end of the clamp. Mounted against the outer face of the lug 30 is a flat washer 34; and seated against the outer face of this washer is a rubber or rubber-like spring washer 36. A cup washer 38 seats on the outer face of this washer 36 and is disposed between the outer face of the washer 36 and the inner face of the head of the screw 26.

The split clamp 22 itself has a three-point bearing on the post as shown in FIG. 5, the bearing portions being denoted at 40. One of the three bearing portions 40 is formed partly on the inside surface of the lug portion 30 and partly on the inside surface of the lug portion 32.

The three-point bearing of the clamp on the post makes adjustment of each support member 20 on the post or bar 12 easy. If the clamp had a full circular bearing on the post, then any out of round, even of .0001 inch, would cause binding of the clamp on the post. With the three point contact, binding is avoided, and the clamp supporting member can readily be adjusted on the post.

Moreover, the squeezing action exerted on post 12 by virtue of the pressure of the rubber or spring washer 36 on the split clamp 20 enables each split clamp to be held frictionally in any position to which it is adjusted prior to tightening up the split clamp, and it permits each split clamp and the indicating member carried thereby to be run up or down the post 12 to adjust the indicating member with amazing accuracy (within .0002″) to a desired position. This is an important feature of the invention. As the screw 26 is tightened up the rubber or rubber-like spring washer 36 is compressed and the gap between the cup washer 38 and the flat washer 34 is closed until finally the cup washer 38 bottoms solid on the flat washer 34. During this compression stage, pressure is applied by the clamp on the post slowly and smoothly, thereby making it possible to adjust the clamp on the post easily and accurately. Moreover, when the cup washer 38 bottoms against the flat washer 34 the part is rigidly clamped to the post.

Each of the clamping members 20 has a hole 42 extending vertically through its laterally projecting portion 24. A rod or stud is mounted in each hole. In the case of the indicating members 14 and 15 the rod or stud is pressed into the clamp body from the bottom using the smooth stud portion as a guide. The whole assembly is then positioned in a grinding fixture and the upper face of the stud or rod is ground accurately perpendicular to the axis of the post-receiving hole in the clamp body and to project at the desired distance above the clamp body. The stud 44 in the indicating member 14 is of greater height or length than the stud 45 in the indicating member 15.

Mounted in the holes 42 in the indicating members 16 and 17 are rods 46 and 47. These rods are alike except for length. The rod 47 is the longer of the two. Secured to the bottom of each rod by a flat head screw 48 is a foot or ledge 50. This foot or ledge is hardened and ground. In the instance shown it has plane upper and lower surfaces. However, it might be made with a convex surface to have line contact with the surface whose height is being gauged.

Figure 6:
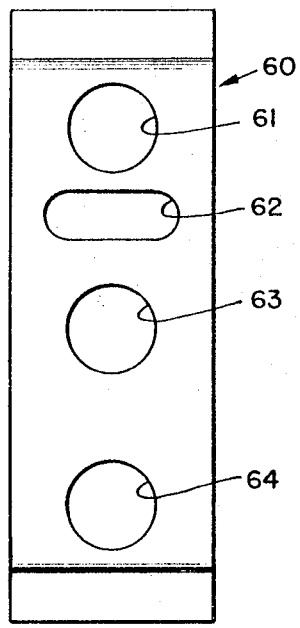
FIG. 6 is a side elevation of a part having a plurality of surfaces of different heights, respectively, whose heights may be gauged quickly by using the comparator of the present invention for setting the height gauge.

Various formed parts, especially sheet metal parts, made on a press brake, or by piercing, and various machined parts, such as blocks having two or more steps, can be gauged quickly and accurately using the device of the present invention to set up or position the height gauge itself. Thus, for gauging a part 60, such as shown in FIG. 6, made of sheet metal, and having four holes 61, 62, 63, and 64, therein, the part 60, which is to be gauged, may be clamped to a bracket (not shown) that is mounted upon a conventional face plate (not shown); the comparator of the present invention may be mounted adjacent it on the face plate; and a stand 70 having a post 72 mounted therein on which a conventional dial gauge 75 is adjustably mounted, may be positioned between the comparator and the work 60. In use, the indicating or positioning member 17 may be clamped to the post 12 so that the top of its foot or ledge 50 will be at a height above the surface plate (the bottom surface of base 10) corresponding to the desired height of the bottom of the hole 64 in part 60, the indicating or positioning member 16 may be positioned so that the upper surface of its foot or ledge 50 will similarly be at a height corresponding to the desired height of the bottom of the hole 63 in the part 60; the indicating or positioning member 15 may be positioned so that the top face of stud 45 will be at a height corresponding to the desired height of the top of the elongate hole 62 in the part 60; and the indicating or positioning member 14 may be positioned so that the top surface of the stud 44 will be at a height corresponding to the desired height of the top of the hole 61 in the part 60. To gauge the height of the bottom of the hole 63 in the part 60, then, the dial gauge 75 is adjusted on post or spindle 72 until it finger 76 contacts the top of the ledge 50 on indicating member 16; the dial gauge may then be locked in position on post 72 and set to zero; and the finger 76 is brought into contact with the bottom of the hole 63. If hole 63 is properly stamped in part 60, the dial gauge will read zero. The dial gauge can then be adjusted on post or spindle 72 to bring finger 76 into contact with the top surface of the ledge 50 of indicating member 17, and the gauge will then be locked into position on post 72 and the finger 76 will then be brought into engagement with the bottom of the hole 64 in the part 60. If the reading on the gauge 75 when in engagement with the bottom of the hole 64 is the same as its reading when engaging the top of ledge 50 of indicating member 17, the hole 64 will be in the right height location on the work. If the reading is different the part will not be correctly machined; the dial gauge will tell how much the hole 64 is off. Similarly, the gauge 75 can be used to gauge the position of hole 62 in workpiece 60 by shifting the gauge upwardly on post 72, bringing its finger 76 into contact with the top face of stud 45, locking the gauge there, setting the gauge to zero or taking its reading, then, without moving the gauge on the post 72, bringing its finger 76 into engagement with the top edge of the hole 62, and reading the gauge 75. Likewise the position of hole 61 in the workpiece 60 can quickly be gauged for height by shifting gauge 75 along post 72 to bring its finger into contact with the top of stud 44, locking the gauge in position, reading the gauge or setting its dial to zero, then bringing finger 76 into contact with the top edge of hole 61, and reading the gauge dial.

The means 77 for mounting the gauge 75 on the post 72 and releasably clamping it in different positions on the post may be conventional and may comprise a conventional split clamp, or it may be a split clamp similar to split clamps 20.

By precisely locating the top surfaces of the studs 44 and 45 and the ledges 50 of the rods 46 and 47 beforehand, then, the correctness or incorrectness of the positions of the holes 61, 62, 63 and 64 in the part 60 and the spacing of these holes from one another can quickly be determined by bringing the finger of gauge 75 alternately into engagement with a surface or ledge and with one of the holes of part 60; the part will pass or will not pass according to the reading of the gauge 75.

The positions of the various gauging members 14, 15, 16 and 17 on the post 12, can be precisely located by the use of Johansson blocks or by a dial gauge, or in any other suitable manner.

The comparator of this invention may also be used as a "go" and "no-go" gauge by positioning any two of the gauging members as shown, for instance, in FIG. 2. The indicating or positioning members of the comparator may then be used directly as gauging members. The indicating member 17 may be so positioned on the post 12 that its ledge or foot 50 will contact the bottom of a hole in the part 60 when the hole is in the highest acceptable position; and the ledge 50 of the indicating member 16 will contact the bottom of this same hole when the hole is in the lowest acceptable position. If neither ledge contacts the bottom of the hole, then the part does not come within the prescribed manufacuring tolerance. If the foot 50 on the member 17 enters the hole without engaging the part, but the foot 50 on the member 16 does engage the part, the hole is properly located, and the part is acceptable. The indicating members 16 and 17 may also be used in cooperation with the upper face of base 10 to determine whether a part is of acceptable thickness or whether an upper surface of it is located at an acceptable height above a lower surface thereof. Here if the part can be passed between the lower surface of the ledge 50 of indicating member 17 but will not pass between the lower surface of the ledge 50 of indicating member 16 and the upper surface of base 10, the part will be of acceptable thickness or its two surfaces will be an acceptable distance apart, as the case may be.

Figure 7:
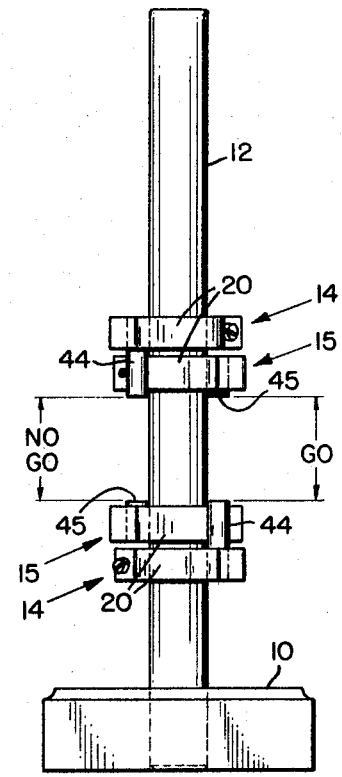
FIG. 7 is a vertical sectional view illustrating how the comparator may be set to be used as an adjustable snap "go" and "no go" gauge.

FIG. 7 illustrates how the device may be used as an adjustable snap "go" and "no-go" gauge.

Here the posts 46 and 47 with their ledge 50 may be removed from their clamps 20 and studs 44 and 45 may be substituted therefor, or two additional indicating members 14 and 15 may be substituted for the indicating members 16 and 17. In either event there are thus provided on post or spindle 12 the equivalent of two sets of indicator members 14 and 15.

The upper set is so disposed on the post 12 that studs 44 and 45 project downwardly below their clamps 20, and that these studs are displaced from one another angularly about the post 12 with the stud 44 projecting over the clamp which carries the stud 45, and below the stud 45 itself. The lower set is so disposed on the post 12 that the studs 44 and 45 of this set project upwardly above their clamps 20, and that these studs are displaced angularly from one another about the post 12 with the stud 44 projecting over the clamp which carries the stud 45 but disposed below the top of stud 45. The distance between the upper stud 45 and the lower stud 44 will then be greater than the distance between upper stud 44 and lower stud 45.

The upper stud 45 and lower stud 44 may then be used as a "go" gauge, their confronting surfaces being adjusted to be a distance apart equal to the desired height or thickness, for instance, of a part, which is to gauged, plus an allowable tolerance. The upper stud 44 and lower stud 45 will then be positioned to have their confronting surfaces spaced just less than an acceptable height or thickness of the part which is to be gauged. The actual difference between the "go" and "no-go" distance may be only a few thousandths of an inch.

With this kind of set-up a part which can be inserted between the upper stud 45 and the lower stud 44 will be acceptable providing it cannot be inserted between the upper stud 45 and the lower stud 44. If it cannot be inserted between the upper stud 45 and the lower stud 44, it will not be acceptable.

When the comparator is used in a "go" or "no-go" operation, the two indicating members can be set any vertical distance apart. With rods 46, 47 and studs 44, 45 of different heights, there is possible a range of from .001 inch up to any desired tolerance.

As is indicated, the indicating members can be positioned at different heights on the post 12 and in different vertical and angular relations to one another. Thus, as shown in FIG. 2, the indicating member 17 is disposed above the indicating member 16; whereas in FIG. 1 the indicating member 16 is disposed above the indicating member 17. Moreover, it will be seen by comparison of these two figures and from FIG. 7 that the indicating members may be disposed at different angular positions about the axis of the post.

It will be obvious, also, that any number of indicating members may be employed to gauge simultaneously any number of surfaces on a piece of work which are displaced in the direction of height from one another. The angular adjustability of the indicating members permits measuring, also, the vertical displacement of surfaces from one another even though these surfaces be displaced angularly from one another. To change the vertical positions of the indicating members or their angular positions, or to remove one indicating member from the post and replace it, or to change the vertical positions of the indicating members relative to one another, takes but a second. All that is necessary to do is to manipulate the associated screw 26.

The ledges or feet 50, which can be lowered beneath the top of base 10, also permit gauging surfaces that are disposed below the top of the base 10 of the fixture.

While the comparator has been shown in connection with the testing of a part which has a series of holes in it, as has the part 60, it will be understood that this is only one illustration of the use to which the comparator of the present invention may be put. It may be employed in gauging the surfaces of any formed part, as, for instance, a stamping having two or more horizontal surfaces displaced from one another by vertical portions. The whole height of the part can be gauged as well as the distance between the horizontal portions. The comparator may be employed for testing the location of pierced holes, also, and the vertical distance apart of machined, as, for instance, milled surfaces. Other uses of the comparator will be apparent to those skilled in the art.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A multi-height comparator comprising
   (a) a base,
   (b) a cylindrical post extending upwardly from said base, and
   (c) an indicating member removably mounted on said post for vertical adjustment thereon and for angular adjustment about the axis of said post,
   (d) said indicating member comprising a split clamp surrounding said post and having confronting lugs,
   (e) a headed screw slidable through one of said lugs and threading into the other to tighten said clamp on said post, and
   (f) a resilient member surrounding said screw and interposed between the head of said screw and said one lug to exert pressure on said one lug to hold said clamp resiliently in any adjusted position on said post while permitting the adjustment of said clamp on the post prior to tightening of the screw, said resilient member being disposed in a cup-shaped washer which is disposed between the head of said screw and said resilient member and normally held away from said one lug by said resilient member, and said resilient member being compressible, upon tightening said screw, to close the gap between said cup-shaped washer and said one lug to tighten said clamp on said post.

2. A multi-height comparator as claimed in claim 1, wherein said resilient member is a block of rubber-like material.

3. A multi-height comparator as claimed in claim 2, wherein said clamp has an internal three-point bearing on said post.

4. The combination with a cylindrical post, of
   (a) a member adjustable axially and angularly on and about said post, and
   (b) means for adjustably securing said member in any adjusted position on said post comprising
   (c) a split clamp having opposed lugs,
   (d) a headed screw whose shank passes through one lug and threads into the other lug,
   (e) a cup-shaped washer mounted on the shank of said screw and interposed between the head of said screw and said one lug, and
   (f) a rubber-like block surrounding the shank of said screw and interposed between said washer and said one lug, said block exerting sufficient pressure on said one lug, before said screw is tightened, to hold said split clamp in any adjusted position on said post, with said washer spaced from said one lug, while permitting adjustment of said split clamp on said post, said screw when tightened closing the gap between said washer and said one lug to hold said clamp tightly on said post.

References Cited by the Examiner

UNITED STATES PATENTS

| | | | |
|---|---|---|---|
| 652,521 | 6/1900 | Pratt | 33—170 XR |
| 1,502,806 | 6/1924 | Berg | 33—165 XR |
| 2,774,144 | 12/1956 | Conger | 33—143 |
| 3,016,618 | 1/1962 | Speed et al. | 33—168 |

FOREIGN PATENTS 623,054  7/1961  Canada.

ROBERT B. HULL, *Primary Examiner.*

LEONARD FORMAN, *Examiner.*

WILLIAM K. QUARLES, JR., *Assistant Examiner.*